Sept. 5, 1933.  W. H. FERGUSON  1,925,752
AUTOMATIC RECORDING MECHANISM
Original Filed Nov. 22, 1924   3 Sheets-Sheet 1

Sept. 5, 1933. W. H. FERGUSON 1,925,752
AUTOMATIC RECORDING MECHANISM
Original Filed Nov. 22, 1924   3 Sheets-Sheet 3

William H Ferguson
Inventor

Patented Sept. 5, 1933

1,925,752

UNITED STATES PATENT OFFICE 1,925,752

AUTOMATIC RECORDING MECHANISM

William H. Ferguson, Marshfield, Oreg.

Refiled for application Serial No. 751,554, November 22, 1924. This application March 5, 1929. Serial No. 344,524

1 Claim. (Cl. 234—5.8)

This application is a substitute for my earlier application for Recording device and graph for the recording of the time distribution over the operation and delay of sawmill carriages, Serial No. 751,554, filed November 22, 1924.

This invention related to recording devices, and more particularly has reference to an automatic recording mechanism associated with a sawing machine, and which is operated in conjunction with the sawing machine to record all operations of the machine relative to time.

In order to efficiently operate a sawmill, it is essential that the workmen be paid on a basis of their efficiency. Their efficiency is usually determined by the actual amount of labor expended in converting a raw product, such as logs, into a finished product, such as lumber. Since the quantity of finished product produced from various sizes of log varies under certain conditions, it cannot be used as a basis for determining the efficiency of an operator. The logical method for determining the efficiency of an employee is to record the operation of the machine under his control. From the record of the operation of this machine, his degree of efficiency can be ascertained.

An object of this invention is to provide a recording mechanism, adapted to be associated with a sawing machine to produce a permanent, accurate record of the time distribution of the movement of logs through the saws of the machine.

Another object of this invention is to provide a recording mechanism which, when associated with a sawing machine, will produce a record of the number of logs sawed and the lines struck in each log.

Yet another object of this invention is to provide a mechanical device adapted to be associated with a sawing machine, in such a manner that a record of all of the operations of the machine will be produced.

Still another object of this invention is to provide a recording mechanism, adapted to be associated with a sawing machine, by means of which a record of the efficiency of the sawyer operating the machine can be produced.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claim.

In accordance with my invention a recording device is operatively associated with the log-moving mechanism of a sawmill. The recording device consists of a base, on which a block is slidably mounted. A screw-threaded shaft extends across the base and engages a threaded aperture in the block. The threaded shaft is connected through suitable gearing with a shaft, which is rotated by the driving means for the carriage, or log-moving mechanism of the sawmill, or by any moving part associated therewith. In one form of my invention the threaded shaft is geared to a shaft, which is rotated by means of a cord attached to the carriage, or "shot-gun" feed thereof, and which passes over a sheave, or pulley, mounted on the shaft. A tracing element carrying arm is associated with the screw-threaded block and so adapted to trace a line on a chart, which is moved at right angles to the movement of the tracing element.

In order to make my invention more clearly understood, I have shown in the accompanying drawings means for carrying the same into practical effect, without limiting the improvements in their useful applications to the particular constructions, which for the purpose of explanation, have been made the subject of illustration.

Figure 1:
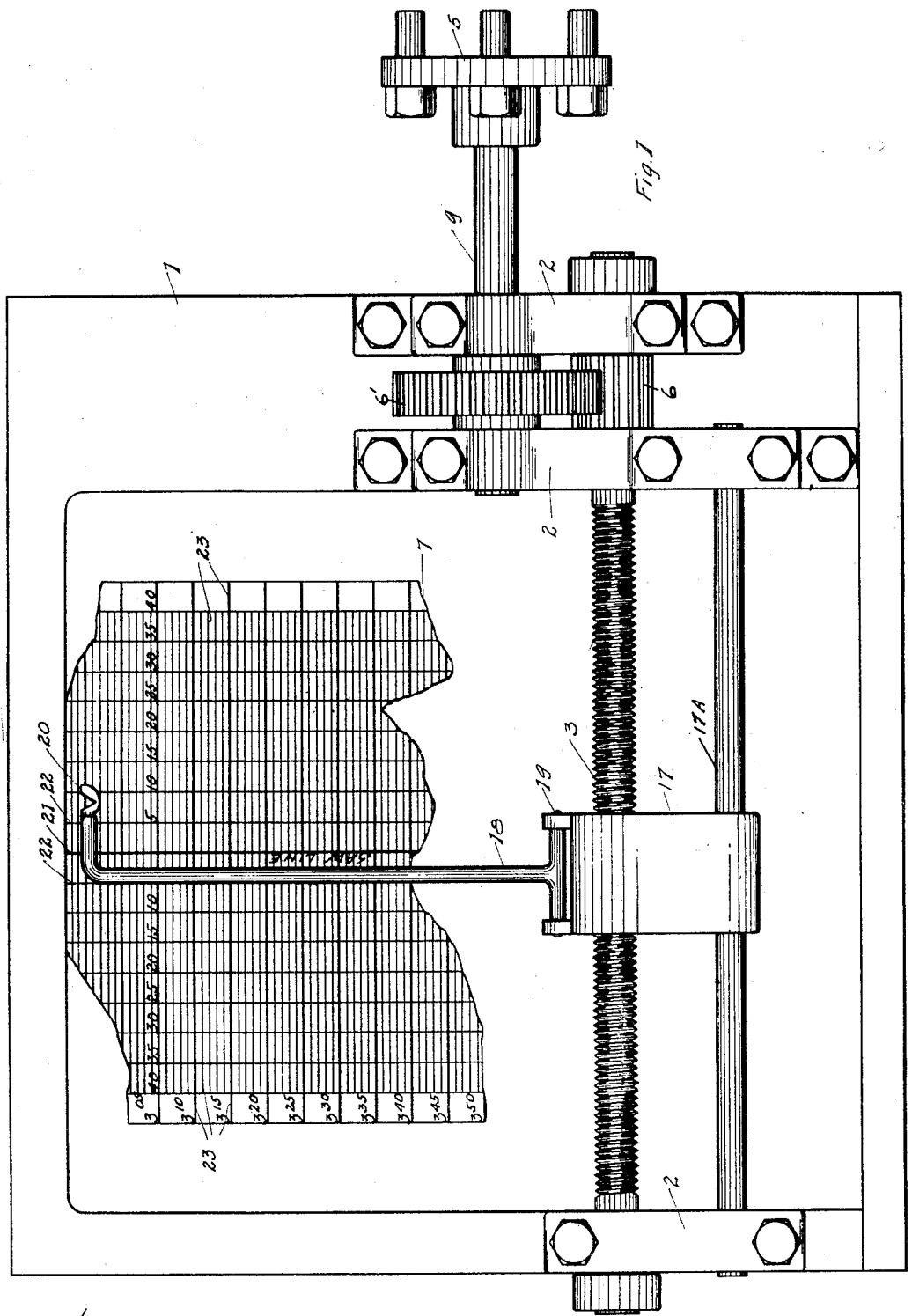
Figure 1 is a plan view of the recording mechanism connected with a driving shaft.
Figure 2:
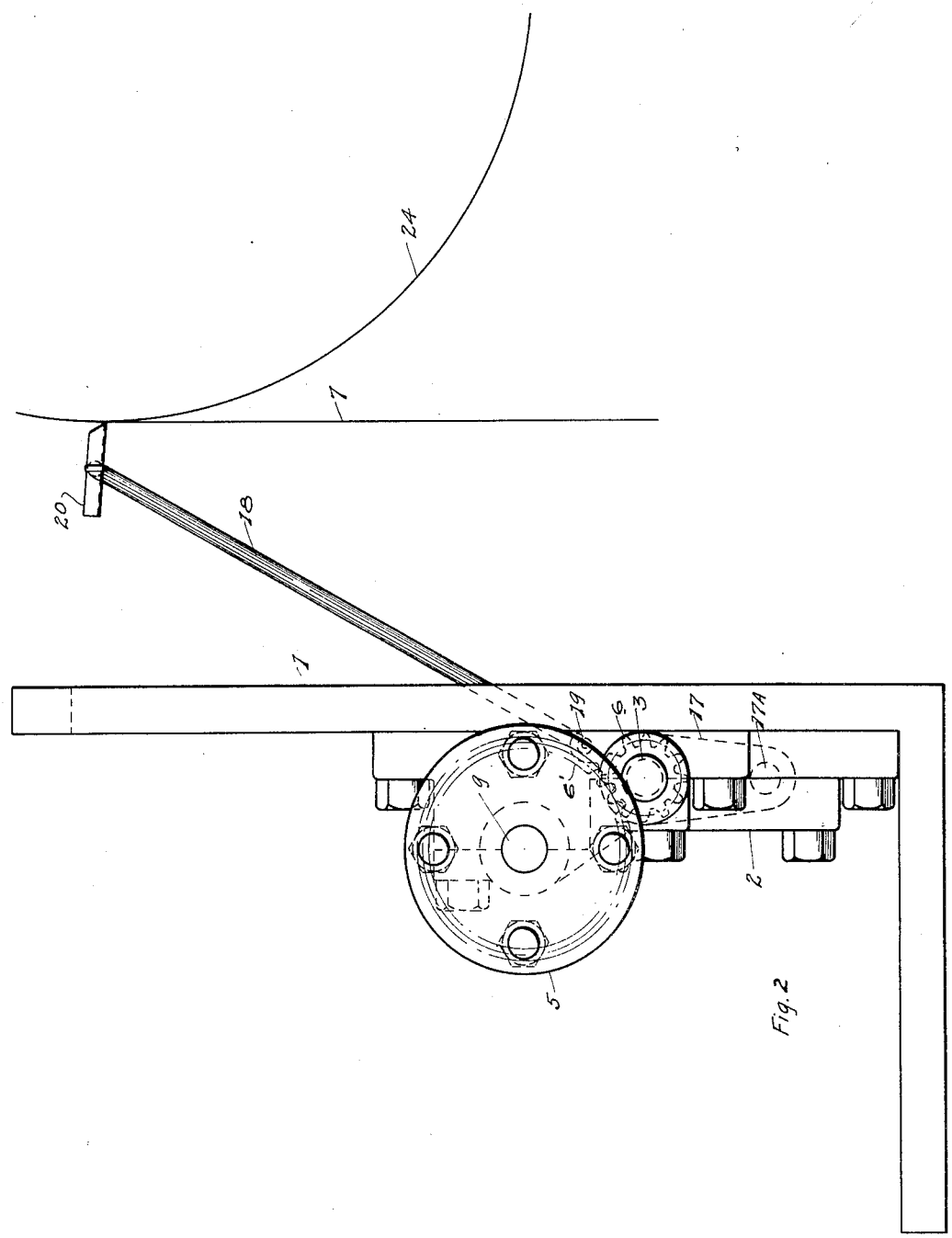
Figure 2 is an end elevation of the device shown in Figure 1.

Referring to the drawings in which similar reference characters refer to similar parts throughout the several views, there is shown in Figures 1 and 2 a recording mechanism constructed in accordance with my invention. The recording mechanism comprises an L-shaped base 1, on the upright portion of which are mounted a plurality of members 2, serving as supports for the rod, or shaft, 17A, and as bearings for the screw-threaded shaft 3, and the driving shaft 9. As is clearly shown in Figure 1, shafts 3 and 9 are provided with gears 6 and 6' respectively, which intermesh to transmit rotary motion from shaft 9 to shaft 3. The sizes of these gears may be varied as desired to secure any speed ratio between the shafts 3 and 9, suitable for proper operation of the recording device.

A block, or unit, 17 is provided with a plurality of apertures, one of which is plain, and the other of which is threaded. Shaft 3 and rod 17A are so positioned that the former passes through the threaded aperture of block 17, and the latter passes through the plain aperture. This arrangement provides a construction wherein the block, or unit, 17 is slidable on rod 17A, and is moved on the rod by means of the screw-threaded shaft 3. While the shaft 3 has been described as being rotated through gearing 6, by shaft 9, I wish it to be clear that the shaft 3 may be rotated directly from any source of motion to be hereinafter set forth.

An arm 18 is pivotally mounted on block, or unit, 17, as is shown in Figure 1. The free end of arm 18 is preferably constructed as shown in Figure 1 to receive a tracing element 20, which may be in the form of a pen, or any other suitable means for tracing lines on a chart to be described hereinafter.

Positioned behind the vertical portion of base 1 is a drum, or roller, 24. This roller is operatively associated with a clockwork mechanism in such a manner that it rotates at a predetermined rate. The upright portion of base 1 is provided with a cut-out portion, through which the tracing element carrying arm 18 projects, as shown in Figures 1 and 2. Arm 18 is of such a length, and drum 24 is so positioned, that the tracing element 20 will engage the surface of the roller 24, as shown in Figure 2.

Passing over roller, or drum, 24 is a strip chart 7, which is so associated with the roller 24 as to move therewith. The chart may be supplied from a roll not shown, or from any other source of supply. This chart 7 is provided with a plurality of lines 23 extending across the chart transversely to the length thereof and spaced to represent any determined unit of time. As shown in Figure 1, heavy lines are provided at intervals, representing five minutes, and lighter lines are provided at one minute intervals. The chart shown in Figure 3 differs slightly in that heavy lines are provided at one minute intervals and lighter lines at intervals of ten seconds. Time indicating indicia are provided on the graph at determined intervals.

In each of several forms of charts a datum line 21, indicated as "Saw line" extends the full length thereof. A plurality of lines 22 are arranged on the chart extending parallel to the "Saw line" and are equidistantly spaced apart. These lines represent the distance of a particular part of the log carriage from the cutting edge of the saw in all positions of the carriage and are provided with indicia representative of a determined unit of measure.

The datum, or "Saw line" may be positioned on the chart as desired, preferably to correspond to a particular log carriage. In order to facilitate reading of the graph, the thickness of the lines 21, 22 and 23 may be varied, and certain of the lines may be of different colors from other lines.

Figure 4:
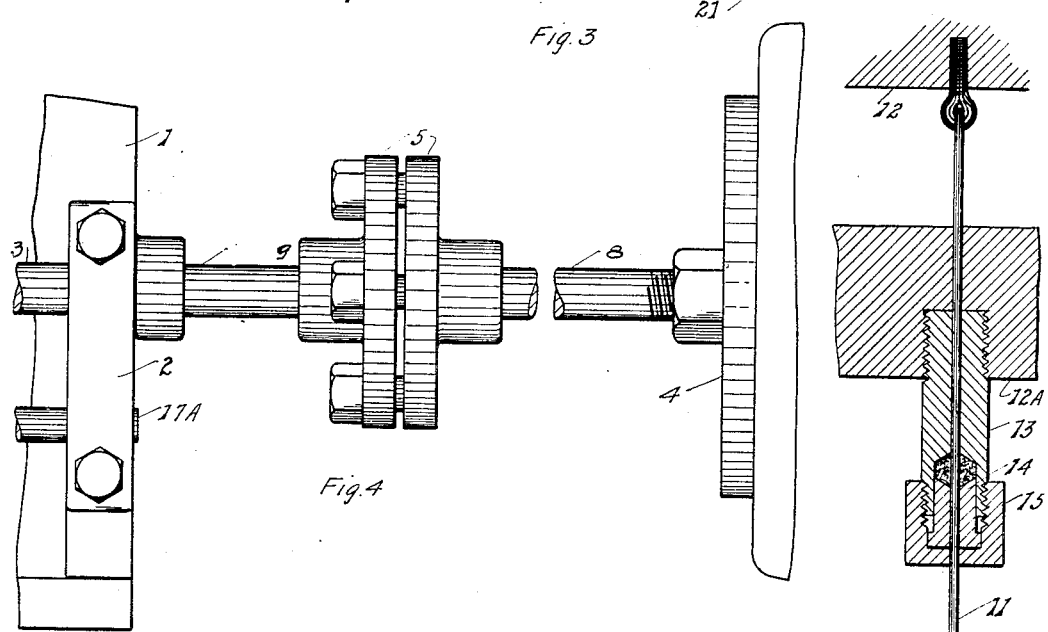
Figure 4 is a detailed view showing the driving shaft of the recording mechanism connected with a driving means for the carriage of the sawmill.

The recording device may be operatively associated with various parts of the sawmill. In Figure 4 the drive for the recording device is shown connected to a drive unit for the log carriage of the sawmill. Shaft 3, through gearing 6 to shaft 9, is connected by a flexible coupling 5 to shaft 8, which is directly connected with a rotating element 4 associated with the driving mechanism for the log carriage. This element may be the driving motor, engine, or other driving means, or element operating therewith.

Figure 3:
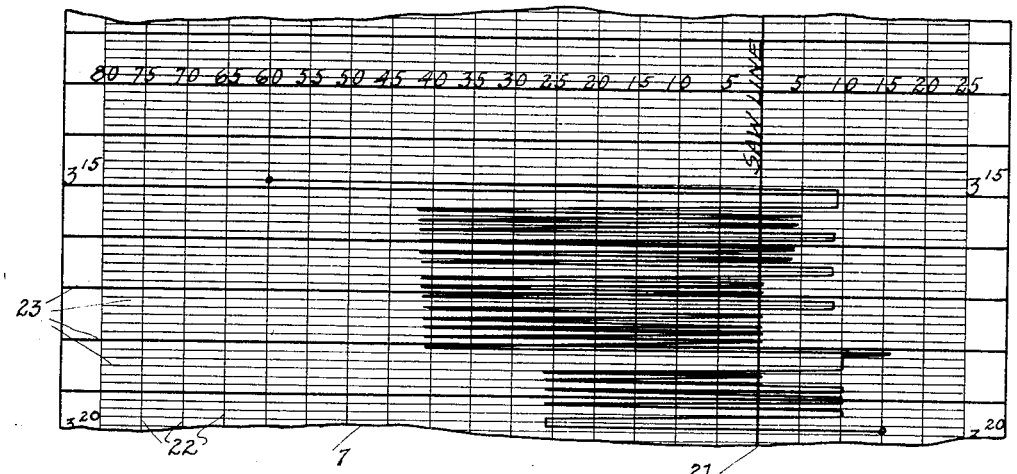
Figure 3 is a view of a graph containing a record of the operation of the carriage of a sawmill.

The distance of travel of the tracing element 20 is, by means of the pitch of the threads on shaft 3 and the relative speeds of shafts 3 and 9, proportioned to the actual travel of the log carriage, so that the tracing element will move over the chart correspondingly to the movement of the log carriage relative to the saw. Thus any and all movements of the carriage and the speed and number of movements of the carriage in a given time will be recorded on the chart 7 as indicated in Figure 3.

Figure 5:
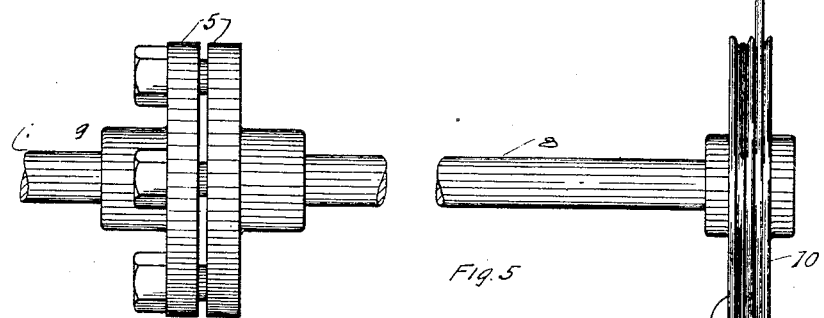
Figure 5 is a view similar to Figure 4 showing a modification of my invention in which the driving shaft for the recording mechanism is operatively associated with the piston of a "shot-gun" feed for the carriage of the sawmill.

Another form of operating mechanism is shown somewhat diagrammatically in Figure 5. In this form shaft 9 is connected to a shaft 8 by a flexible coupling 5. A sheave 10 is fixed to shaft 8 so as to rotate therewith. This sheave is provided with several grooves, one of which receives a flexible element carrying a weight 16 to return the recording mechanism to its original position. A flexible cable 11 is positioned in the other groove of sheave, or pulley, 10 and is connected directly to the log carriage, or to some moving part associated therewith. Both of the flexible elements, or cables, have one end secured to the sheave to provide for positive action.

A preferred form of my invention consists in connecting flexible element 11 directly with the moving part, or piston, 12 of a "shot-gun" feed for moving the log carriage relative to the saw. This "shot-gun" feed consists of the piston 12, which is usually attached to the carriage, and the stationary steam cylinder 12A, within which the piston reciprocates. The carriage is driven directly by means of steam admitted into the cylinder 12A, which forces the piston outwardly. As shown in Figure 5, the cylinder 12A is provided with a stuffing box, or gland, comprising the elements 13, 14 and 15 to prevent leakage of the driving fluid from the cylinder.

In this form of my invention the distance of travel of the tracing element 20 is proportioned by the speed reducing mechanism to correspond to that of the log carriage to indicate the movements of the carriage as described above.

The operation of the recording device and graph may be best explained by analyzing the operation recorded in Figure 3. Just before 3.15 the carriage had unloaded her last board on the sixty foot line in rear of the saw and then gigged back to the nine foot line in front of the saw to load, which took twenty seconds, which is shown by the short vertical line. The sawyer then struck three lines and then turned his log which is shown by the short vertical line of about ten seconds length, he then struck three more lines and turned his log a second time, he then struck three more lines and turned his log a third time, and then struck five lines before he dropped his last two pieces and gigged back to load again.

The diagram also shows the time of each and every operation, just where the carriage was at all times and how long it was there; it shows that the log was forty feet long; that it was small, judging from the speed shown by the feed and gig lines; and also, that only light cuts were made as there was no pause at the end of the feed, which would occur if heavy flitches were being turned down. The log after the first three lines were struck showed up common for the way the sawyer slabbed and then took off two cuts and then turned showed he was peeling off the little clear that was in the log and showed there was little of this for he got it in three cuts on each side. The five lines struck after the third turn would further bear this out and also the fact that the heart was broken into two inch or heaver plank.

The sawyer was feeding and gigging fast and was also a little careless at first for he overtravelled on the first few cuts but soon got the carriage under control as he cut down his travel on both sides of the saw to a minimum. The diagram shows that fourteen lines in all were struck. After dropping the last two planks he brought his carriage back so fast that he had to bring it ahead a little to a loading position for the next log, which took about the same time as the first log to load. The diagram shows the second log to be twenty-four feet long, that on the first cut the sawyer took off too light a slab and then decided to take off a board before he turned.

After that he slabbed heavier and turned his log after each slab. After the third turn he slabbed and then had to wait either for the rolls to clear or the slab to get out of the way before he dropped the timber into which the diagram shows he made his log. The pause back of the saw, if the graph shows it occurs frequently, would show that either someone is slow in getting the rolls cleared or the rolls themselves were too slow, or that there is a congested condition existing at the edgers. The way the log was sawed would indicate that there was no clear lumber and since only four lines were struck the sawyer took off a heavy slab for the resaw to finish.

It will be appreciated that I have provided a structure which may be easily associated with a sawmill to record the operations of the carriage to determine the efficiency of the machine and of the operator in control of the machine.

While I have shown and described the preferred embodiment of my invention, I wish it to to understood that I do not confine myself to the precise details of construction herein set forth, by way of illustration, as it is apparent that many changes and variations may be made therein, by those skilled in the art, without departing from the spirit of the invention, or exceeding the scope of the appended claim.

I claim:

In a sawmill having a log moving carriage and a carriage moving means, a recorder comprising a support having a horizontal base and a vertical portion, brackets on the vertical portion, a screw mounted in said brackets, a block mounted on said screw, an arm pivotally mounted upon said block and extending through an opening in the vertical portion of the support, a clock mechanism operated roller, a graph sheet associated with said roller, a tracing element supported upon the end of the arm and bearing upon the graph sheet, and means connected with the carriage moving means for rotating the screw.

WILLIAM H. FERGUSON.